(12) United States Patent
Wang et al.

(10) Patent No.: US 11,928,723 B2
(45) Date of Patent: Mar. 12, 2024

(54) SYSTEMS AND METHODS FOR FACILITATING ONLINE SEARCH BASED ON OFFLINE TRANSACTIONS

(71) Applicant: Walmart Apollo, LLC, Bentonville, AR (US)

(72) Inventors: Yu Wang, Jersey City, NJ (US); Dianhui Zhu, Fremont, CA (US); Ayush Parshotam Ruchandani, Sunnyvale, CA (US); Cun Mu, Jersey City, NJ (US); Ying Michelle Sun, Palo Alto, CA (US); Saumya Agarwal, Milpitas, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 183 days.

(21) Appl. No.: 17/389,111

(22) Filed: Jul. 29, 2021

(65) Prior Publication Data
US 2023/0035109 A1     Feb. 2, 2023

(51) Int. Cl.
*G06Q 30/00*     (2023.01)
*G06F 18/2113*     (2023.01)
(Continued)

(52) U.S. Cl.
CPC ..... *G06Q 30/0639* (2013.01); *G06F 18/2113* (2023.01); *G06F 18/214* (2023.01);
(Continued)

(58) Field of Classification Search
CPC ............... G06Q 30/00; G06Q 30/0601; G06Q 30/0613; G06Q 30/0641
See application file for complete search history.

(56) References Cited

U.S. PATENT DOCUMENTS 7,334,184 B1 * 2/2008 Simons ............... G06F 16/9535
                                                              715/234
8,112,429 B2    2/2012 Vadon et al.
(Continued)

FOREIGN PATENT DOCUMENTS

WO     2011017452 A2     2/2011

OTHER PUBLICATIONS

Chan, Tat Y., Chunhua Wu, and Ying Xie. "Measuring the lifetime value of customers acquired from google search advertising." Marketing Science 30.5 (2011): 837-850. (Year: 2011).*
(Continued)

*Primary Examiner* — Christopher B Seibert
(74) *Attorney, Agent, or Firm* — Morgan, Lewis & Bockius LLP; Manita Rawat

(57) ABSTRACT

This application relates to systems and methods for facilitating online search based on offline transaction data. In some examples, a disclosed system includes a computing device that is configured to: obtain an online search request that is submitted by a user to an online retailer; generate an online search result comprising a plurality of items that match the query and are available at a first physical retail store associated with the online retailer; generate online search data based on the online search request and the online search result; obtain in-store purchase data of the user, wherein the in-store purchase data comprise at least one offline transaction initiated by the user at one or more physical retail stores associated with the online retailer for purchasing at least one item of the plurality of items within a predetermined time period after generating the online search result; generate, for the query and for each of the at least one item purchased offline, an order feedback signal by associating the in-store purchase data with the online search (Continued)

data; and perform an online search based on the order feedback signal, in response to the query from any user.

17 Claims, 14 Drawing Sheets

(51) Int. Cl.
    *G06F 18/214*     (2023.01)
    *G06Q 20/12*     (2012.01)
    *G06Q 30/0601*     (2023.01)

(52) U.S. Cl.
    CPC ......... *G06Q 20/12* (2013.01); *G06Q 30/0603* (2013.01); *G06Q 30/0643* (2013.01)

(56) References Cited

U.S. PATENT DOCUMENTS

| | | | |
|---|---|---|---|
| 8,688,524 B1 | 4/2014 | Ramalingam et al. | |
| 10,796,338 B2 | 10/2020 | Cohn et al. | |
| 2002/0174023 A1* | 11/2002 | Grey | G06Q 40/04 705/37 |
| 2005/0028082 A1* | 2/2005 | Topalov | G06F 15/167 715/224 |
| 2005/0256841 A1* | 11/2005 | Rawat | G06F 40/174 |
| 2006/0069763 A1* | 3/2006 | Kido | H04L 67/1001 709/223 |
| 2007/0185844 A1* | 8/2007 | Schachter | G06F 16/9535 |
| 2009/0030749 A1* | 1/2009 | Drummond | G06Q 30/06 705/7.31 |
| 2009/0204881 A1* | 8/2009 | Murthy | G06F 40/174 715/226 |
| 2011/0041170 A1* | 2/2011 | Wankmueller | H04L 63/12 715/764 |
| 2011/0047608 A1* | 2/2011 | Levenberg | H04L 63/0807 726/7 |
| 2013/0047242 A1* | 2/2013 | Radhakrishnan | H04L 9/3231 726/9 |
| 2014/0149846 A1* | 5/2014 | Ansel | G06F 16/958 715/234 |

OTHER PUBLICATIONS

Dawes, John, and Magda Nenycz-Thiel. "Comparing retailer purchase patterns and brand metrics for in-store and online grocery purchasing." Journal of Marketing Management 30.3-4 (2014): 364-382. (Year: 2014).*

* cited by examiner

FIG. 5

SYSTEMS AND METHODS FOR FACILITATING ONLINE SEARCH BASED ON OFFLINE TRANSACTIONS

TECHNICAL FIELD

The disclosure relates generally to online search and, more specifically, to facilitating online search based on offline transactions.

BACKGROUND

A user can search for items online, e.g. through a website or a mobile app. For example, the website or app may include a search bar that allows the user to enter search terms, such as one or more words, and display search results determined by a search algorithm based on the search terms. When the website or app is associated with a retailer, the search results may identify items that are offered for purchase by the retailer. A large retailer typically has a number of physical retail stores with items or products stocked therein. While a retail store may have thousands of sections and hundreds of aisles for the products, traversing these aisles and looking for specific products may be a harrowing experience. As such, a user or customer may use a mobile device running a mobile app of the retailer to search for an item or product within the retail store. These search results, however, can have drawbacks. For example, the search results may include items that do not correspond to the intent of the person conducting the search. In other examples, items that a person would be interested in may appear lower in the search results, which can cost the person significant time to ignore irrelevant search results before viewing relevant search results. While user engagement data related to previous search results are used by some existing methods to enhance the search result presentation, a user conducting the search for an item may directly go to a retail store to buy the item without further engagement to the search results, which makes the user engagement data unavailable. As such, existing methods to improve search results, such as those in response to a search query for an item in a retail store, are not entirely satisfactory.

SUMMARY

The embodiments described herein are directed to facilitating and optimizing online search based on offline transaction data. While search results of the online search are ranked according to a search ranking model, offline transaction data by users who searched online can be utilized to train the search ranking model based on machine learning. The offline transaction data of each user can be associated with online search data of the user, based on both user identification (ID) of the user and item identifications (IDs) of items in offline transactions and/or online search results. As such, future search result ranking may be performed based on the online-offline association and the trained search ranking model.

In accordance with various embodiments, exemplary systems may be implemented in any suitable hardware or hardware and software, such as in any suitable computing device.

In some embodiments, a disclosed system for facilitating online search includes a computing device that is configured to: obtain an online search request that is submitted by a user to an online retailer, wherein the online search request comprises a query related to a first physical retail store associated with the online retailer; generate an online search result comprising a plurality of items that match the query and are available at the first physical retail store; generate online search data based on the online search request and the online search result; obtain in-store purchase data of the user, wherein the in-store purchase data comprise at least one offline transaction initiated by the user at one or more physical retail stores associated with the online retailer, wherein the at least one offline transaction is for purchasing at least one item of the plurality of items within a predetermined time period after generating the online search result; generate, for the query and for each of the at least one item purchased offline, an order feedback signal by associating the in-store purchase data of the user with the online search data; and perform an online search based on the order feedback signal, in response to the query from any user.

In other embodiments, a method is provided for facilitating online search. The method includes: obtaining an online search request that is submitted by a user to an online retailer, wherein the online search request comprises a query related to a first physical retail store associated with the online retailer; generating an online search result comprising a plurality of items that match the query and are available at the first physical retail store; generating online search data based on the online search request and the online search result; obtaining in-store purchase data of the user, wherein the in-store purchase data comprise at least one offline transaction initiated by the user at one or more physical retail stores associated with the online retailer, wherein the at least one offline transaction is for purchasing at least one item of the plurality of items within a predetermined time period after generating the online search result; generating, for the query and for each of the at least one item purchased offline, an order feedback signal by associating the in-store purchase data of the user with the online search data; and performing an online search based on the order feedback signal, in response to the query from any user.

In yet other embodiments, a non-transitory computer readable medium having instructions stored thereon is provided. The instructions, when executed by at least one processor, cause a device to perform operations comprising: obtaining an online search request that is submitted by a user to an online retailer, wherein the online search request comprises a query related to a first physical retail store associated with the online retailer; generating an online search result comprising a plurality of items that match the query and are available at the first physical retail store; generating online search data based on the online search request and the online search result; obtaining in-store purchase data of the user, wherein the in-store purchase data comprise at least one offline transaction initiated by the user at one or more physical retail stores associated with the online retailer, wherein the at least one offline transaction is for purchasing at least one item of the plurality of items within a predetermined time period after generating the online search result; generating, for the query and for each of the at least one item purchased offline, an order feedback signal by associating the in-store purchase data of the user with the online search data; and performing an online search based on the order feedback signal, in response to the query from any user.

BRIEF DESCRIPTION OF THE DRAWINGS

The features and advantages of the present disclosures will be more fully disclosed in, or rendered obvious by the following detailed descriptions of example embodiments.

The detailed descriptions of the example embodiments are to be considered together with the accompanying drawings wherein like numbers refer to like parts and further wherein:

FIG. 5 illustrates exemplary search results before and after implementing a trained search ranking model based on offline transaction data, in accordance with some embodiments of the present teaching;

DETAILED DESCRIPTION

Figure 1:
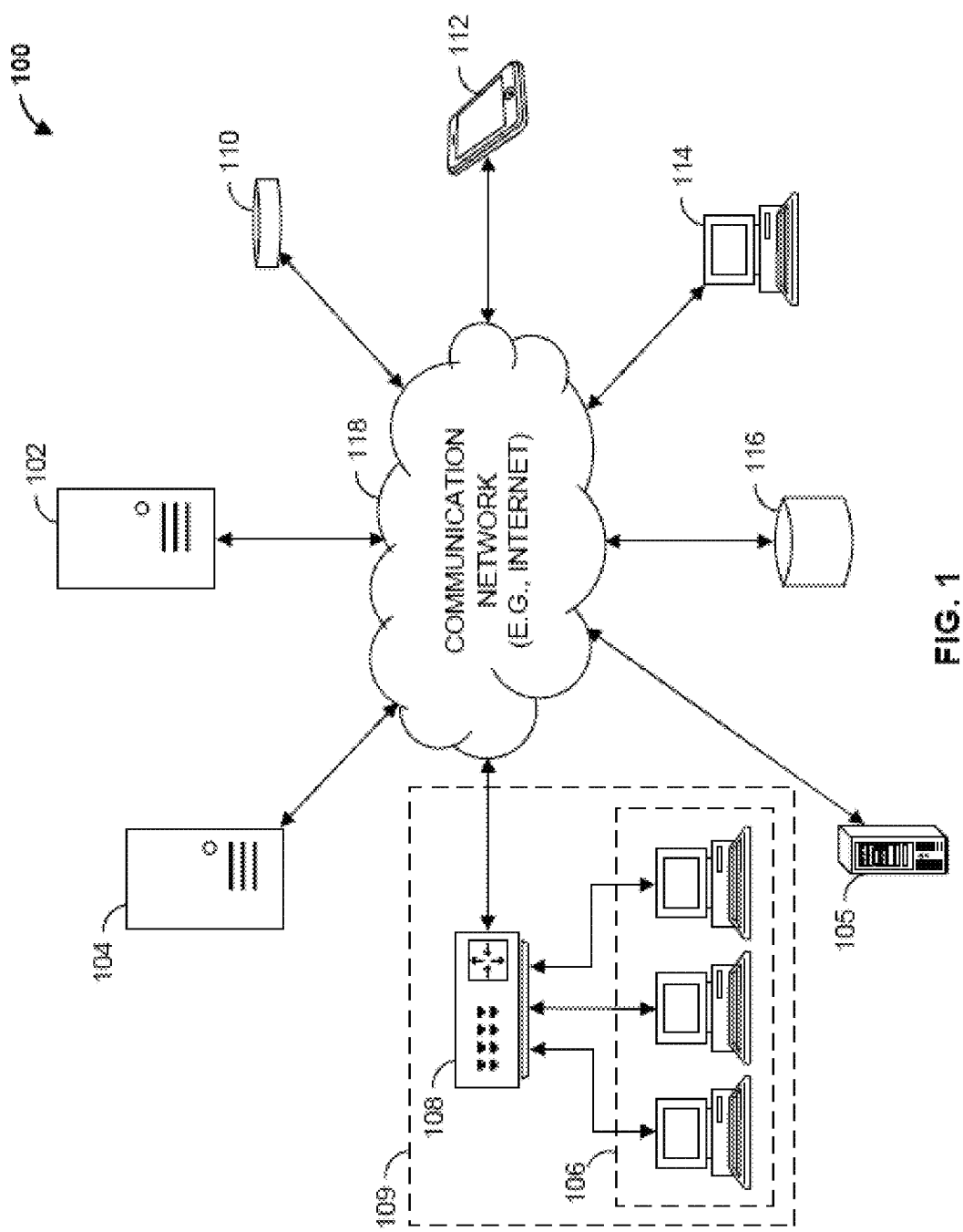
FIG. 1 is a block diagram of an exemplary communication system used to facilitate online search, in accordance with some embodiments of the present teaching.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an exemplary communication system 100 that includes a search result computing device 102 (e.g., a server, such as an application server), a web server 104, workstation(s) 106, a database 116, a ranking model training system 105, and multiple customer computing devices 110, 112, 114 operatively coupled over a communication network 118. The search result computing device 102, workstation(s) 106, the server 104, the ranking model training system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the communication network 118.

In some examples, the search result computing device 102 can be a computer, a workstation, a laptop, a server such as a cloud-based server, or any other suitable device. In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the search result computing device 102 is operated by a retailer, and the multiple customer computing devices 112, 114 are operated by customers of the retailer.

Although FIG. 1 illustrates three customer computing devices 110, 112, 114, the communication system 100 can include any number of customer computing devices 110, 112, 114. Similarly, the communication system 100 can include any number of workstation(s) 106, search result computing devices 102, web servers 104, ranking model training systems 105, and databases 116.

The workstation(s) 106 are operably coupled to the communication network 118 via a router (or switch) 108. In some embodiments, the workstation(s) 106 and/or router 108 may be located at a store 109, e.g. a store of multiple physical retail stores of a retailer. In some embodiments, one of the many physical retail stores of the retailer, e.g. the store 109, may also have online retail services. The workstation(s) 106 can communicate with the search result computing device 102 over the communication network 118. The workstation(s) 106 may send data to, and receive data from, the search result computing device 102. For example, the workstation(s) 106 may transmit purchase data related to orders purchased by customers at the store 109 to the search result computing device 102. In some examples, the search result computing device 102 may transmit, in response to received purchase data, an indication of one or more item advertisements to provide to a customer. For example, the item advertisements may be displayed on a receipt handed to the customer for the purchase order.

In some examples, the web server 104 hosts one or more web pages, such as a retailer's website. The website may allow for the purchase of items. The web server 104 may transmit purchase data related to orders to the search result computing device 102. In some examples, the web server 104 transmits user session data to the search result computing device 102. The user session data identifies events associated with browsing sessions. The web server 104 may also transmit a search request to the search result computing device 102. The search request may identify a search query provided by a customer. In response to the search request, the search result computing device 102 may generate a search result comprising a plurality of items that match the search query, such as by displaying the items on a search result webpage.

The first customer computing device 110, second customer computing device 112, and $N^{th}$ customer computing device 114 may communicate with the web server 104 over the communication network 118. For example, each of the multiple computing devices 110, 112, 114 may be operable to view, access, and interact with the website hosted by the web server 104. In some examples, the website allows a customer to search for items via, for example, a search bar. A customer operating one of the multiple computing devices 110, 112, 114 may access the website via an executed browsing application and perform a search for items on the website by entering in one or more terms into the search bar. In response, the website may return search results identifying one or more items. The website may further allow the customer to add one or more of the items received in the search results to an online shopping cart, and allow the customer to perform a "checkout" of the shopping cart to purchase the items.

In other examples, one or more of the multiple computing devices 110, 112, 114 may be installed with a mobile app associated with a retailer, wherein the mobile app is served by the search result computing device 102 and/or the web server 104. A user or customer may perform a search for items on the mobile app by entering in one or more terms into a search bar of the mobile app. In response, the mobile app may return a search result identifying one or more items. The mobile app may further provide in-store information related to each item in the search result, e.g. location information of the item in a user-selected store of the retailer, available quantity of the item in the store, price of the item in the store, etc., which allows the customer to have the relevant information to determine whether to go to the store for purchasing the item and/or where to identify the item in the store.

The search result computing device 102 is operable to communicate with the database 116 over the communication network 118. For example, the search result computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the search result computing device 102, in some examples, the database 116 can be a local storage device, such as a hard drive, a non-volatile memory, or a USB stick of the search result computing device 102. The search result computing device 102 may store purchase data received from the store 109 and/or the web server 104 in the database 116. The search result computing device 102 may also store user session data identifying events associated with browsing sessions, such as when a customer browses a website hosted by the web server 104. In some examples, the database 116 stores one or more machine learning models that, when executed by the search result computing device 102, allow the search result computing device 102 to determine one or more search results, such as items, in response to a search query.

The communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some embodiments, the search result computing device 102 can use trained machine learning models (e.g., algorithms) to generate ranking values that rank items in a search result for a given search query. A first item with a comparatively higher ranking than a second item may indicate that the first item is more relevant to a corresponding search query than the second item. The search result computing device 102 may apply the trained machine learning models to queries to generate ranking values for items corresponding to each query. For example, after a user submits a query, through a website hosted by the web server 104 or a mobile app served by the web server 104, the web server 104 may transmit the search query to the search result computing device 102 and, in response, the search result computing device 102 may generate ranking values for one or more items based on applying a trained machine learning model to the search query. In some embodiments, the search result computing device 102 may directly serve the website or the mobile app, to receive the search query from the user.

In some examples, the search result computing device 102 may obtain a trained search ranking model from a model training system, such as the ranking model training system 105. The ranking model training system 105 may be a third-party server that performs machine learning to train the search ranking model for the search result computing device 102. In some examples, the search result computing device 102 may generate a search order signal based on in-store purchase data of users from the store(s) 109 and online search data of the users from the web server(s) 104, and transmit the search order signal to the ranking model training system 105 and, in response, receive a trained search ranking model. The search result computing device 102 may generate the ranking values for the items as described herein.

The search result computing device 102 may obtain queries from users associated with an online retailer, e.g. through the web server 104 or the search result computing device 102 itself, and generate online search results comprising items matching the queries. The search result computing device 102 may also obtain relevant in-store purchase data for each respective user from the store 109, and generate, for each query and each item purchased offline, a query-item level feedback signal associated with each respective user, e.g. based on user ID and item ID in the in-store purchase data and online search data. Then, the search result computing device 102 may generate a search order signal by aggregating orders and impressions in the query-item level feedback signals across all users; and calculate an offline order through rate (OTR) at the query-item level based on aggregated orders and impressions in each search order signal to obtain offline OTR data. The search result computing device 102 may store all these data into the database 116.

To train a machine learning model for search ranking, the search result computing device 102 may obtain, from the database 116, historical data that identifies and characterizes in-store purchase data (e.g. in terms of offline OTR data) and corresponding search queries. The historical data may be aggregated based on corresponding time periods, such as for a day, a month, a quarter, or a year. In some embodiments, the historical data may also include user engagement data that identifies items a user has engaged (e.g., clicked, ordered, added to cart, etc.) after receiving search results for a search query the user provided via a website or mobile app. Based on the aggregated historical data, the ranking model training system 105 may generate training features for training the search ranking model. The training features may include item-level, query-level, and/or query-item-level based features, e.g. the offline OTR data. In some embodiments, the training features may also include derived features, such as a value indicating how much of a text overlap there is between a query and an item title, a value indicating how much a brand name matches with query intent, and others. For example, the search result computing device 102 may generate feature vectors that identify and characterize item features (e.g., brand, price, item description, item options, etc.), query features (e.g., search terms), item engagement data identifying which items were engaged in response to search results displayed for a search query, and/or derived features. The ranking model training system 105 may obtain or generate some training labels based on human inputs (e.g. based on scale numbers {0, 1, 2, 3, 4} to represent relevance ratings from low to high), and then train a machine learning model for search ranking, such as one based on XGBoost, based on the training labels (serving as training objectives) and training features. Based on the training, the ranking model training system 105 may determine a weight for each trained feature, e.g. a weight for the offline OTR data to indicate how much impact the offline OTR data have when ranking items in a search result. In some examples, the ranking model training system 105 stores the trained machine learning model within the database 116.

Figure 2:
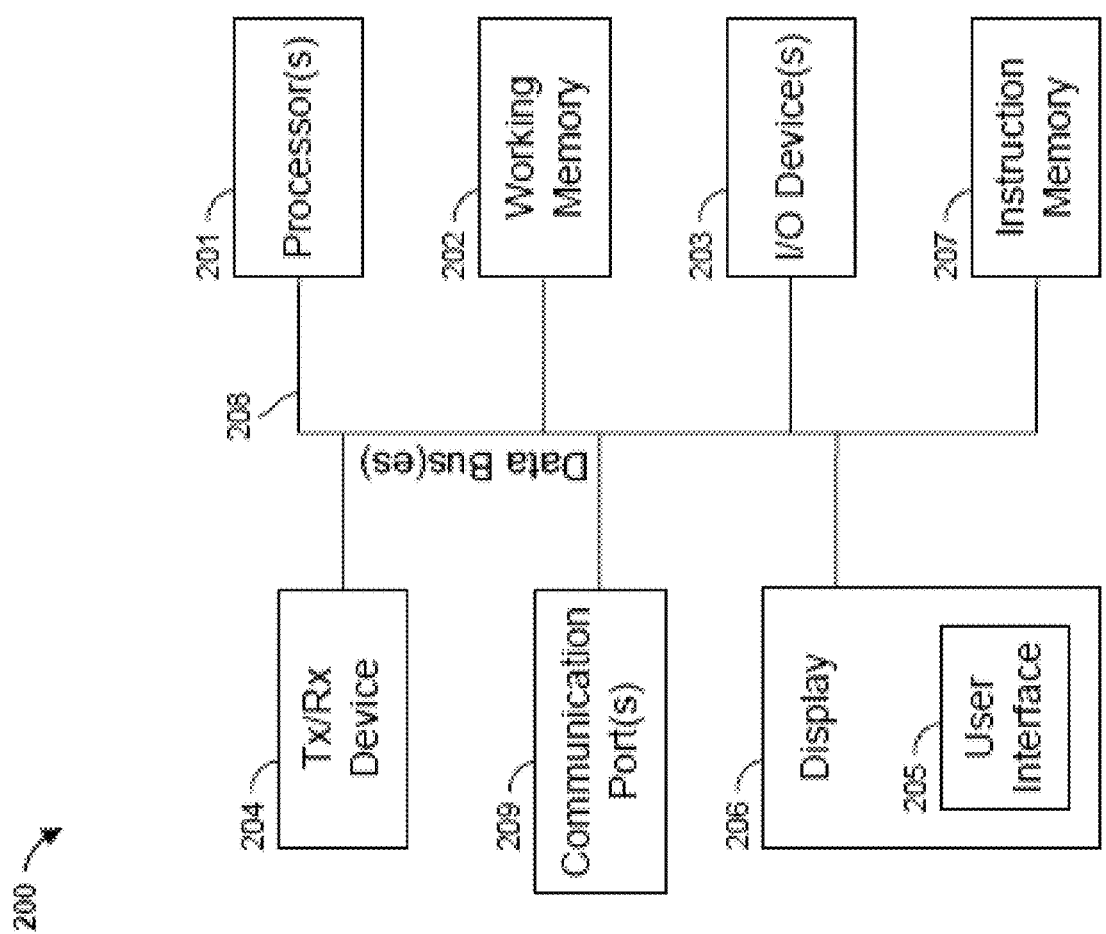
FIG. 2 is a block diagram of a search result computing device of the communication system of FIG. 1, in accordance with some embodiments of the present teaching.

FIG. 2 illustrates an example computing device 200. Any of the search result computing device 102, the web server 104, the ranking model training system 105, the workstation(s) 106, the multiple customer computing devices 110, 112, 114 may include the features shown in FIG. 2. For the sake of brevity, FIG. 2 is described relative to the search result computing device 102. It should be appreciated, however, that the elements described can be included, as applicable, in any of the web server 104, the ranking model training system 105, the workstation(s) 106, and the multiple customer computing devices 110, 112, 114, as well.

As shown in FIG. 2, the search result computing device 102 can be a computing device 200 that may include one or more processors 201, a working memory 202, one or more input/output devices 203, an instruction memory 207, a transceiver 204, one or more communication ports 209, and a display 206, all operatively coupled to one or more data buses 208. The data buses 208 allow for communication among the various devices. The data buses 208 can include wired, or wireless, communication channels.

The one or more processors 201 can include one or more distinct processors, each having one or more processing cores. Each of the distinct processors can have the same or different structures. The one or more processors 201 can include one or more central processing units (CPUs), one or more graphics processing units (GPUs), application specific integrated circuits (ASICs), digital signal processors (DSPs), and the like.

The one or more processors 201 can be configured to perform a certain function or operation by executing code, stored on the instruction memory 207, embodying the function or operation. For example, the one or more processors 201 can be configured to perform one or more of any function, method, or operation disclosed herein.

The instruction memory 207 can store instructions that can be accessed (e.g., read) and executed by the one or more processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

The one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during the operation of the asynchronous conversational computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning algorithm training data.

The display 206 can display a user interface 205. User interfaces 205 can enable user interaction with the asynchronous conversational computing device 102. In some examples, a user can interact with the user interface 205 by engaging input-output devices 203. In some examples, the display 206 can be a touchscreen, where the user interface 205 is displayed by the touchscreen.

The transceiver 204 allows for communication with a network, such as the communication network 118 of FIG. 1. For example, if the communication network 118 of FIG. 1 is a cellular network, the transceiver 204 may be configured to allow communications with the cellular network. In some examples, the transceiver 204 is selected based on the type of communication network 118 which the search result computing device 102 will be operating in. The processor(s) 201 is operable to receive data from, or send data to, a network, such as the communication network 118 of FIG. 1, via the transceiver 204.

Figure 3:
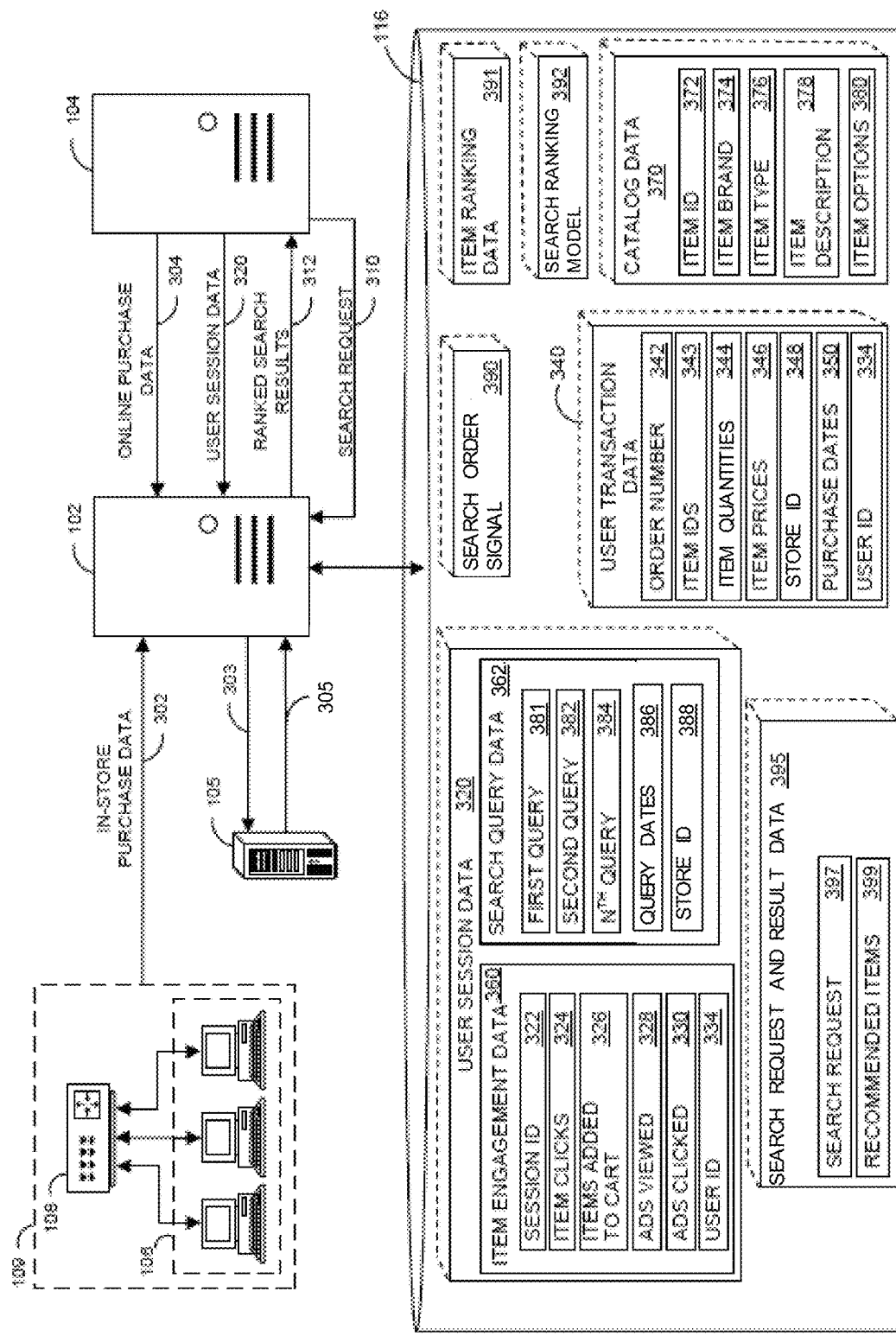
FIG. 3 is a block diagram illustrating examples of various portions of the communication system of FIG. 1, in accordance with some embodiments of the present teaching.

FIG. 3 is a block diagram illustrating examples of various portions of the communication system 100 of FIG. 1. As indicated in FIG. 3, the search result computing device 102 may receive user session data 320 from the web server 104, and store the user session data 320 in the database 116. The user session data 320 identifies, for each user, data related to a browsing session, such as when browsing a retailer's webpage or mobile app served by the web server 104. In this example, the user session data 320 includes item engagement data 360 and search query data 362. In some embodiments, the item engagement data 360 includes a session ID 322 (i.e., a website or mobile app browsing session identifier), item clicks 324 identifying items which the user clicked (e.g., images of items for purchase, keywords to filter reviews for an item), items added-to-cart 326 identifying items added to the user's online shopping cart, and user ID 334 (e.g., a customer ID, retailer website login ID, etc.). In some embodiments, the item engagement data 360 optionally includes advertisements viewed 328 identifying advertisements the user viewed during the browsing session, and advertisements clicked 330 identifying advertisements the user clicked on. In some embodiments, the search query data 362 identifies one or more searches conducted by a user during a browsing session (e.g., a current browsing session). In some embodiments, a query submitted by a user may be associated with a store, e.g. to search for items available at a specified retail store. In this example, the search query data 362 includes: a first query 381, a second query 382, an $N^{th}$ query 384, query dates 386 identifying the dates when the queries are received, and a store ID 388 for the store associated with the queries.

In some embodiments, the search result computing device 102 may also receive in-store purchase data 302 identifying and characterizing one or more purchases from one or more stores 109. Similarly, the search result computing device 102 may receive online purchase data 304 from the web server 104, which identifies and characterizes one or more online purchases, such as from a retailer's website or mobile app. In some embodiments, the search result computing device 102 may parse the in-store purchase data 302 and the online purchase data 304 to generate user transaction data 340. In this example, the user transaction data 340 may include, for each purchase, one or more of: an order number 342 identifying a purchase order, item IDs 343 identifying one or more items purchased in the purchase order, item quantities 344 identifying a quantity for each item purchased, item prices 346 identifying the price of each item purchased, a store ID 348 identifying a store where each item is purchased for in-store transactions, a purchase date 350 identifying the purchase date of the purchase order, and a user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

In some examples, the search result computing device 102 may receive a search request 310 identifying and characterizing a search query from a user. The search query may include data identifying and characterizing one or more words, for example. In some embodiments, the search result computing device 102 may apply a trained machine learning model, such as a search ranking model 392 stored in the database 116, to the search query to generate item ranking values identifying a ranking of items. In some examples, the search result computing device 102 stores the search query, and the corresponding item rankings, in the database 116 as the search request and result data 395. For example, the search result computing device 102 may store the search query as the search request 397, and may store data identifying the ranked items in the search result as the recommended items 399. In some examples, the search result computing device 102 stores the generated ranking values within the database 116 as the item ranking data 391.

In some examples, to train the machine learning model characterized by the search ranking model 392, the search result computing device 102 generates a search order signal or order feedback signal 390 based on both online search data and offline transaction data (e.g. in-store purchase data) of each user. For example, a user may receive recommended items 399 in a search result after submitting a query. The online search data generated for multiple users submitting multiple queries will include: a user ID (e.g. by referencing the user ID 334 in the user session data 320 of a user) for each user and an item ID (e.g. by cross referencing the item ID 372 in the catalog data 370 based on the recommended items 399) for each item of the recommended items 399 in response to a query. Based on the user IDs and the item IDs, the search result computing device 102 may associate the online search data with the users' offline transaction data 340 to generate a search order signal 390 at query-item level. That is, one search order signal 390 is generated for each query-item pair identifying a query and a corresponding item that is purchased offline and appears online in a search result in response to the query. In some embodiments, the search order signal 390 may include a quantity of total offline orders for the item within a time period, and a quantity of impressions of the item in search results within the time period, which may be a day, a week, or a year. That is, the search order signal 390 is an aggregated data across all users over a predetermined time period. Based on each search order signal 390 for each query-item pair, the search result computing device 102 may calculate an offline OTR based on the quantity of total offline orders and the quantity of item impressions in the search order signal 390.

In some examples, the search result computing device 102 transmits the offline OTR and/or the entire search order signal within a training request message 303 to the ranking model training system 105. In response, the ranking model training system 105 trains the search ranking model based on machine learning and training features, and transmits the trained search ranking model to the search result computing device 102 as a training response message 305. The training features may include the offline OTR data, and other related data, e.g. the user engagement data 360 if available. In some embodiments, the search result computing device 102 may generate training labels based on initial ranking (e.g. based on human inputs) of items for a query. As described herein, the ranking model training system 105 may train a machine learning model, such as one based on XGBoost, based on the generated training labels and training features. Further, the ranking model training system 105 may store the trained machine learning model as the search ranking model 392 within the database 116. In some embodiments, the ranking model training system 105 may be integrated into the search result computing device 102, or the search result computing device 102 itself can train the search ranking model 392.

The search result computing device 102 may apply the search ranking model 392 to a search query identified by the search request 310 and to user session data 320 to generate ranked search results 312 identifying ranking values for one or more items. The search result computing device 102 may transmit the ranked search results 312 to the web server 104, where the ranked search results 312 identifies the ranked set of recommended items. The web server 104 may then display the set of recommended items based on the ranking values identified by the ranked search results 312, in response to the search query.

Figure 4A:
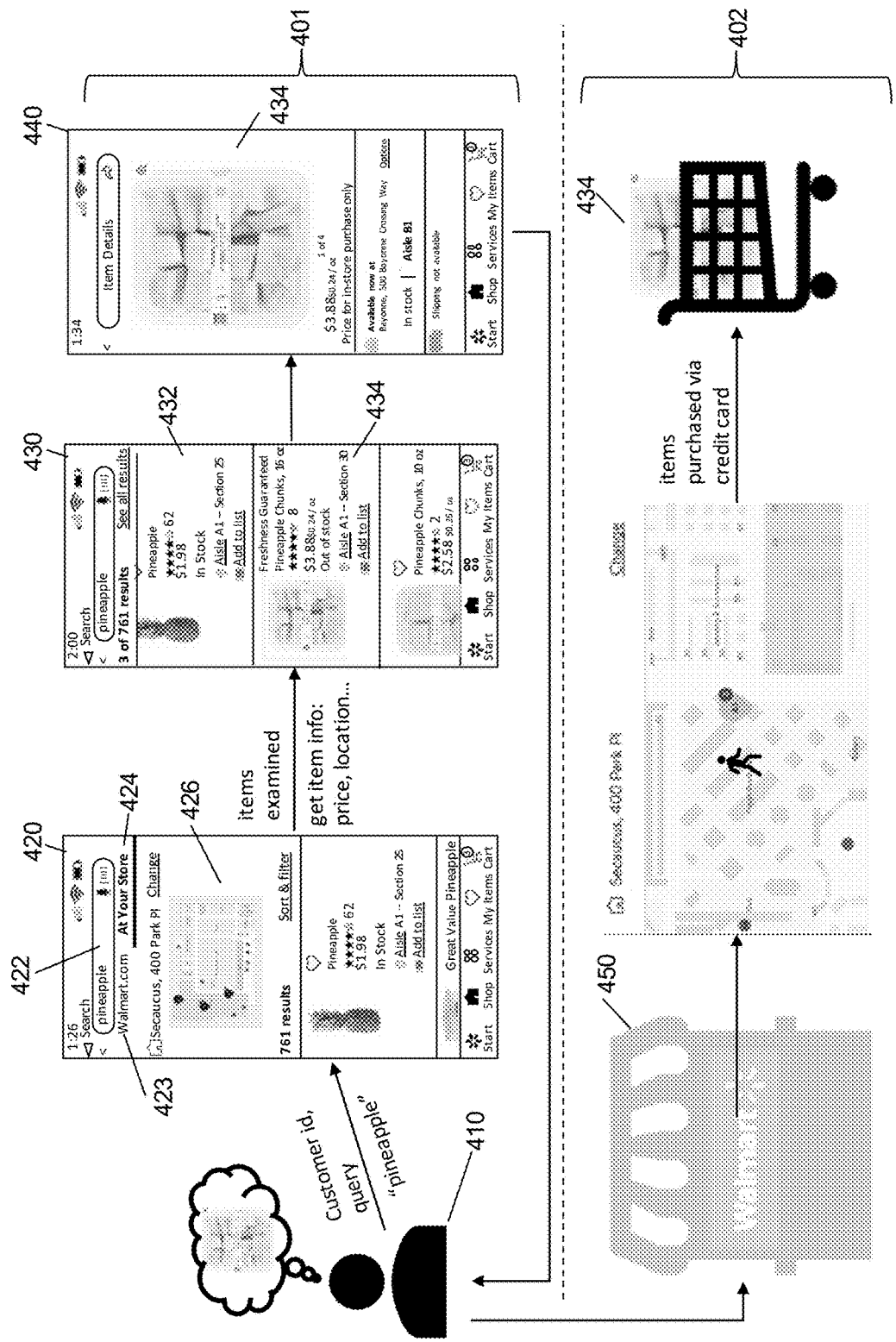
FIG. 4A illustrates an example of a user's online search behaviors and offline transaction behaviors, in accordance with some embodiments of the present teaching.

FIG. 4A illustrates an example of a user's online search behaviors and offline transaction behaviors, in accordance with some embodiments of the present teaching. As shown in FIG. 4A, a user 410 may access a mobile app associated with a retailer, e.g. Walmart, on a mobile device. The user may provide a customer ID to the mobile app, by logging in the mobile app. The customer ID may be associated with: a log in name of the user, credit card information saved by the mobile app in association with the user, or a payment app (e.g. Walmart Pay, Apple Pay, Google Pay, PayPal, etc.) that is associated with the user and saved by the mobile app.

The mobile app in this example has two operation modes: a website mode 423 and a store mode 424. Under the website mode 423, the user 410 may purchase items online directly and have the purchased items shipped to an address specified by the user. Under the store mode 424, the user 410 may select a physical retail store of the retailer and obtain availability and location information of an item at the selected store, such that the user 410 may later go to the store in person to buy the item. In either mode, the user 410 may enter a query at a search bar 422 of the mobile app to search for items matching the query.

In the example shown in FIG. 4A, the user 410 selects the store mode 424, and selects a store of Walmart for searching items. After submitting a query "pineapple" at the search bar 422, the mobile app displays a search result comprising a plurality of items matching the query, in a first view 420 of the mobile app. In addition, a layout map 426 of the selected store may be presented, in the first view 420 of the mobile app, to the user to show location information about the plurality of items.

The user 410 may examine items in the search results to obtain item related information, e.g. picture, price, location, customer review, etc. As shown in a second view 430 of the mobile app, each of the items 432, 434 of the search results is presented with related information for the user 410 to examine. In this example, the user 410 clicks on the 16-oz pineapple chunks 434 to examine detailed information of the 16-oz pineapple chunks 434 in a third view 440 of the mobile app. This illustrates the online search behaviors 401 of the user 410.

Having the item of 16-oz pineapple chunks 434 and its related information in mind, the user 410 in this example goes to a store 450, which is the store selected by the user 410 on the mobile app. Following the location information (e.g. which aisle and which section) of the 16-oz pineapple chunks 434 provided by the mobile app, the user 410 can locate the 16-oz pineapple chunks 434 easily in the store 450 and purchase one or more of the 16-oz pineapple chunks 434, e.g. using a credit card whose information has been saved by the mobile app. This illustrates the offline transaction behaviors 402 of the user 410 related to the 16-oz pineapple chunks 434.

Figure 4B:
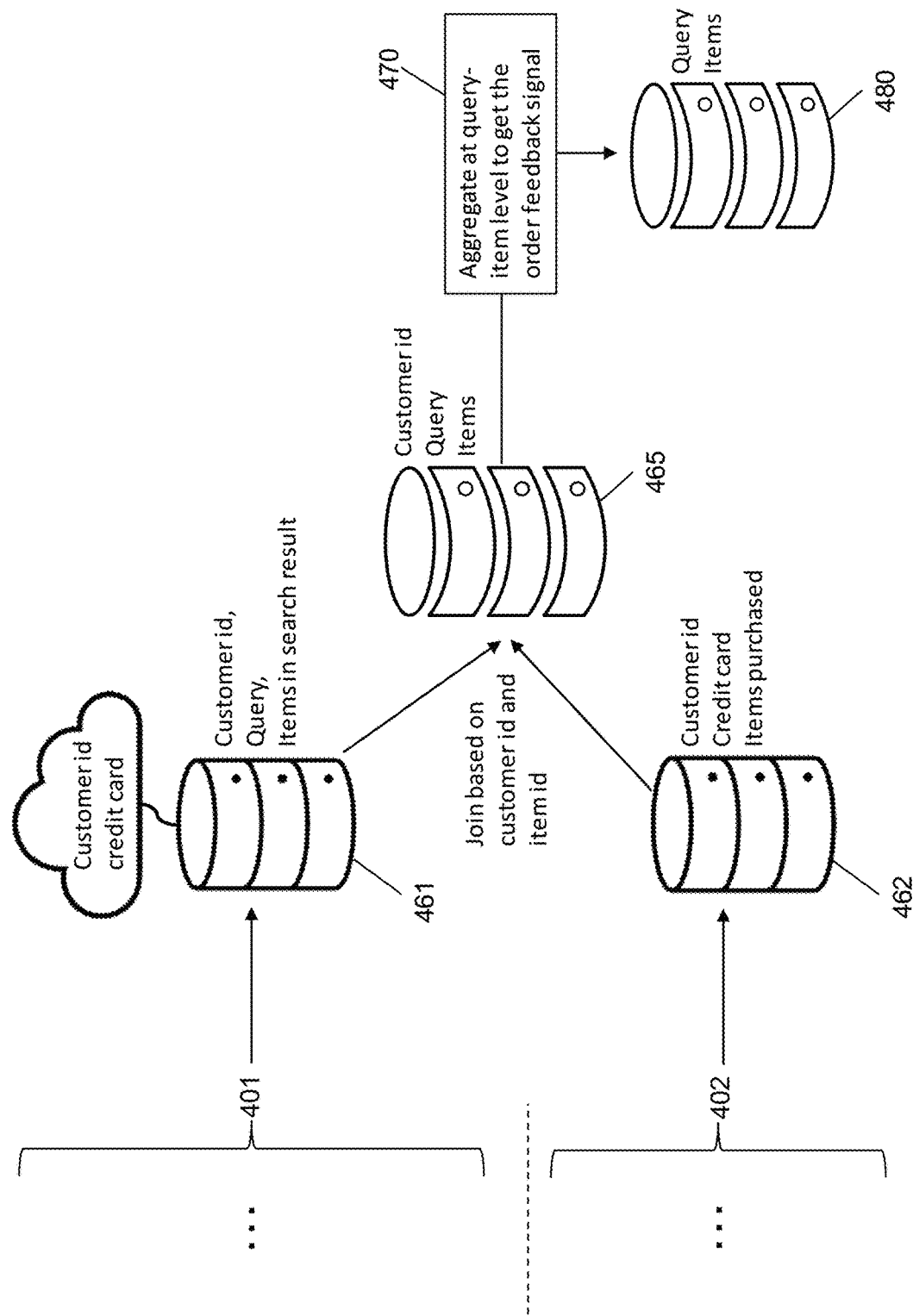
FIG. 4B illustrates an example of data collection and aggregation based on the user's online search behaviors and offline transaction behaviors in FIG. 4A, in accordance with some embodiments of the present teaching.

FIG. 4B illustrates an example of data collection and aggregation based on the user's online search behaviors 401 and offline transaction behaviors 402 in FIG. 4A, in accordance with some embodiments of the present teaching. As shown in FIG. 4B, online search data can be collected based on the user's online search behaviors 401, and stored in a database 461. In some embodiments, the online search data may be collected by the search result computing device 102 or the web server 104 as shown in FIG. 1. In some embodiments, the online search data stored in the database 461 may include information related to: customer ID of the user 410, queries (e.g. "pineapple") submitted by the user 410, and items in search results in response to the queries. In addition, the online search data stored in the database 461 may also include information related to online search behaviors of all users like: customer IDs of the users, queries submitted by the users, and items (with item IDs) in search results in response to the queries. In some embodiments, the customer ID may be pre-collected and linked to the online search data based on log in information, credit card information and/or a payment app of the user.

As shown in FIG. 4B, offline transaction data can be collected based on the user's offline transaction behaviors 402, and stored in a database 462. In some embodiments, the offline transaction data may be collected by the workstation(s) 106 at a store as shown in FIG. 1. In some embodiments, the offline transaction data stored in the database 462 may include information related to: customer ID of the user 410, credit card used by the user 410 at the store, and items purchased at the store. In addition, the offline transaction data stored in the database 462 may also include information related to offline transaction behaviors of all users at all stores like: customer IDs of the users, credit cards used by the users at the stores, and items (with item IDs) purchased at the stores. A disclosed device, e.g. the search result computing device 102, can join the data from the database 461 and the database 462 based on the customer IDs and the item IDs, and store the joined data into the database 465, where the database 465 includes both online search data and offline transaction data indexed by e.g. customer ID, query, and/or item ID. In some embodiments, the search result computing device 102 may aggregate 470 the online search data and offline transaction data in the database 465 at a query-item level to obtain an order feedback signal for each query-item pair, and store the order feedback signals into the database 480. The order feedback signals may be fed back to facilitate online search ranking, e.g. on a daily basis. The order feedback signals may also be used to train or update a search ranking model to be used for future online searches, e.g. on a monthly or yearly basis. In some embodiments, the databases 461, 462, 465, 480 may be integrated together into one database as the database 116 in FIG. 1 and FIG. 3.

Figure 5:
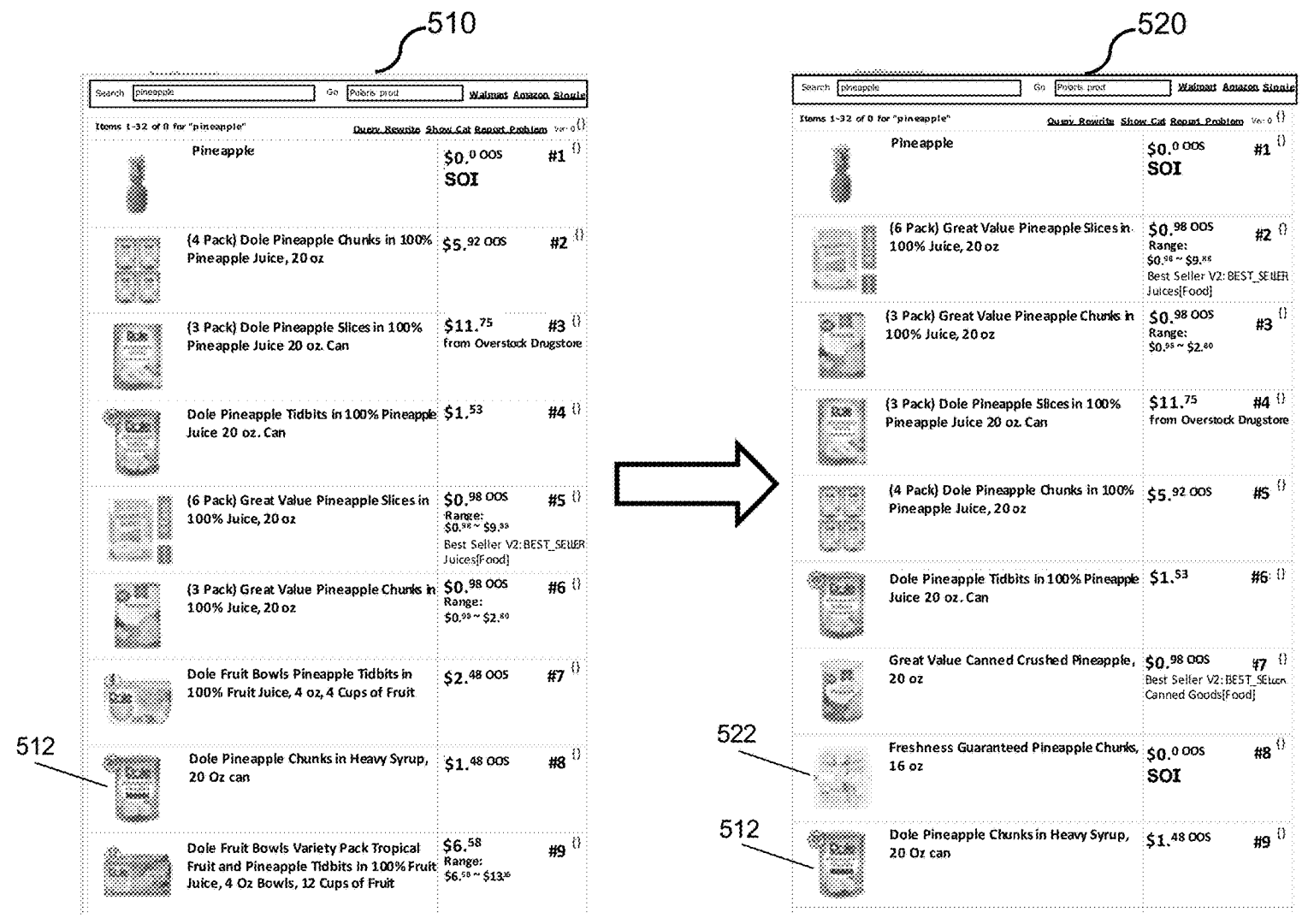

FIG. 5 illustrates exemplary search results before and after implementing a trained search ranking model based on offline transaction data, in accordance with some embodiments of the present teaching. As shown in FIG. 5, after a query "pineapple" is submitted for searching items online, a first search result 510 is returned before implementing a trained search ranking model based on offline transaction data; and a second search result 520 is returned after implementing the trained search ranking model based on the offline transaction data. The items in the first search result 510 and the second search result 520 are different in terms of appearance and/or ranking. For example, the item 522 is not listed in a first page of the first search result 510, but is listed in a first page of the second search result 520, after some users search online using the query "pineapple" and buy the item 522 in physical stores within a predetermined time period from the searching. In addition, the ranking of the item 512 is lower in the second search result 520 than in the first search result 510, and is lower than the item 522 in the second search result 520. This may be because the item 522 has a higher offline order through rate (OTR), which may be calculated by #orders/#impressions, than the item 512, based on the trained search ranking model.

Figure 6:
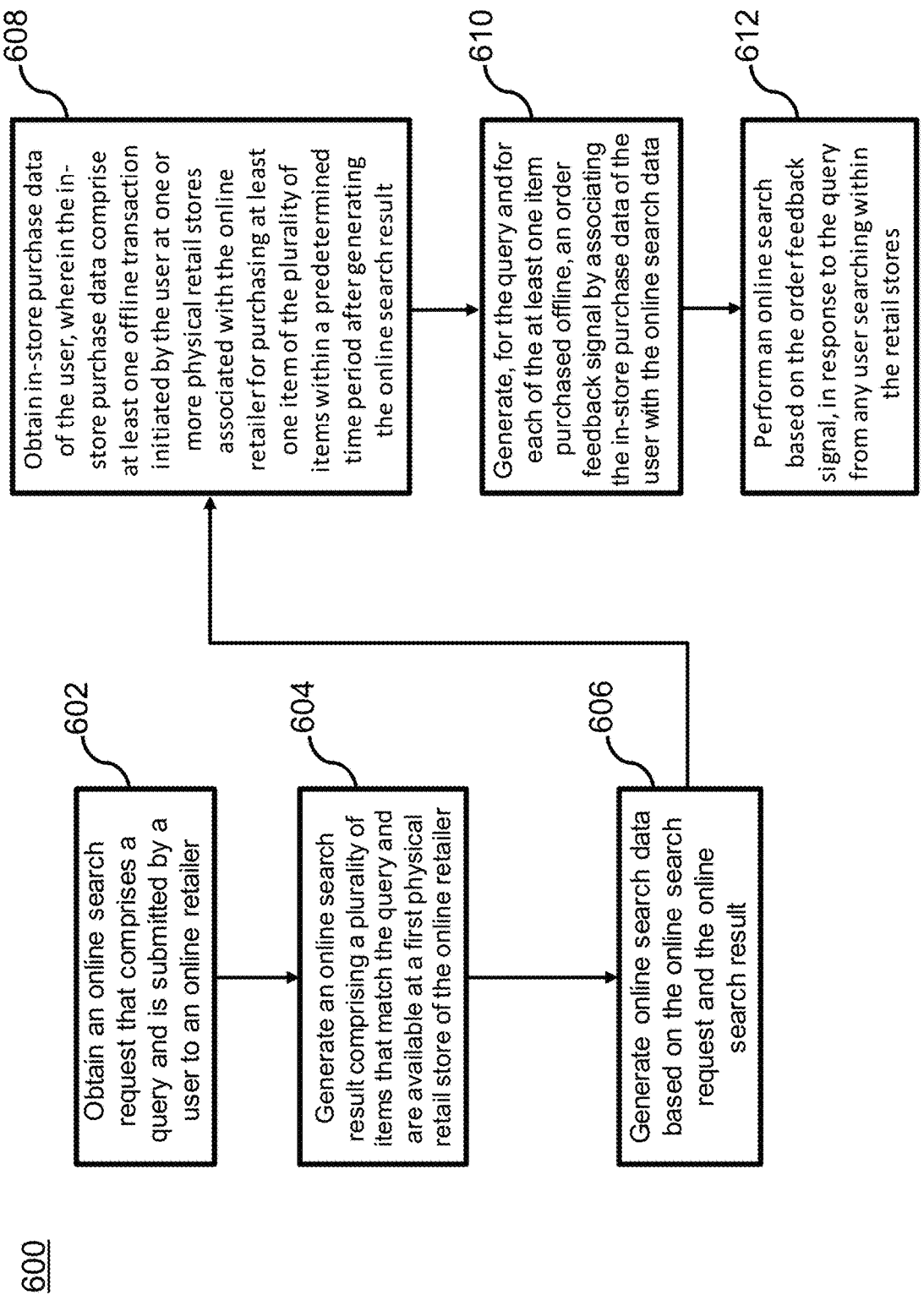
FIG. 6 is a flowchart of an exemplary method for facilitating online search, in accordance with some embodiments of the present teaching.

FIG. 6 is a flowchart of an exemplary method 600, which can be carried out by any computing device, e.g. the search result computing device 102 of FIG. 1, for facilitating online search, in accordance with some embodiments of the present teaching. At operation 602, the search result computing device 102 may obtain an online search request that is submitted by a user to an online retailer. The online search request may comprise a query related to a first physical retail store associated with the online retailer. The online search request may be obtained by the search result computing device 102 or via the web server 104 as in FIG. 1 and FIG. 3. At operation 604, the search result computing device 102 generates an online search result comprising a plurality of items that match the query and are available at the first physical retail store of the online retailer. At operation 606, the search result computing device 102 generates online search data based on the online search request and the online search result. At operation 608, the search result computing device 102 may obtain in-store purchase data of the user. The in-store purchase data comprise at least one offline transaction initiated by the user at one or more physical retail stores associated with the online retailer. The at least one offline transaction is for purchasing at least one item of the plurality of items within a predetermined time period after generating the online search result. At operation 610, the search result computing device 102 generates, for the query and for each of the at least one item purchased offline, an order feedback signal by associating the in-store purchase data of the user with the online search data. At operation 612, the search result computing device 102 performs an online search based on the order feedback signal, in response to the query from any user searching within the retail stores. The order of the operations in FIG. 6 can be changed according to different embodiments of the present teaching.

In some embodiments, the online search request is obtained via at least one of: a website associated with the online retailer; or a mobile app that is associated with the online retailer and installed on a mobile device. In some embodiments, the online search result comprises location information (e.g. aisle and/or section) within the first physical retail store for each of the plurality of items.

Figure 8:
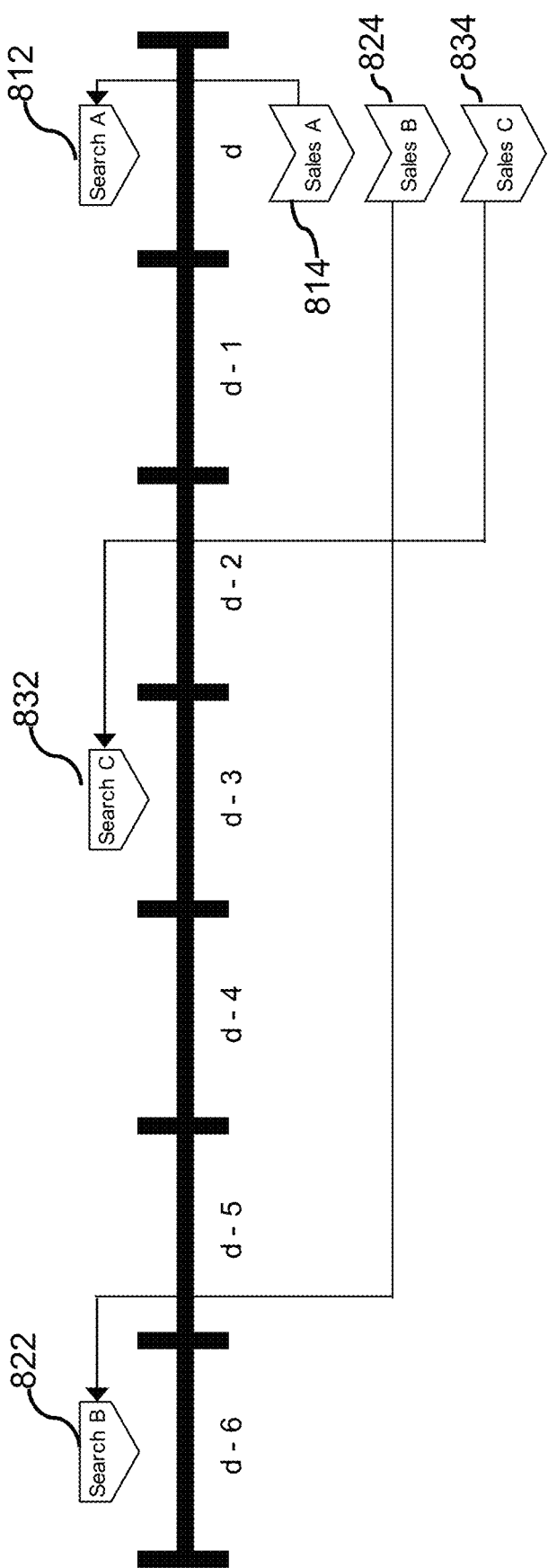
FIG. 8 illustrates a first exemplary association between online search data and offline transaction data, in accordance with some embodiments of the present teaching.

In some embodiments, the predetermined time period is one of: a day, a week, seven days, a month, or a time period depending on the at least one item purchased offline. FIG. 8 illustrates a first exemplary association between online search data and offline transaction data, in accordance with some embodiments of the present teaching. In the example shown in FIG. 8, an offline sale needs to be performed within seven days from a corresponding search to be associated with the search, to facilitate future online searches and impact future search rankings. For example, a search A 812 is performed on day d by user A, who buys an item in the search result of the search A 812 via the sale A 814 at a store, on the same day d. This may be because the user A performs the search A 812 while being in the store, to locate the item. In another example, a search B 822 is performed on day d-6 by user B, who buys an item in the search result of the search B 822 via the sale B 824 at a store on day d (6 days after the search B 822). In yet another example, a search C 832 is performed on day d-3 by user C, who buys an item in the search result of the search C 832 via the sale C 834 at a store on day d (3 days after the search C 832). In the above three examples, each of the offline sales is performed within seven days from a corresponding search, such that data from all of the offline sales should be associated with data of the corresponding searches, to generate online-offline association to facilitate future online searches and impact future search rankings.

Figure 9:
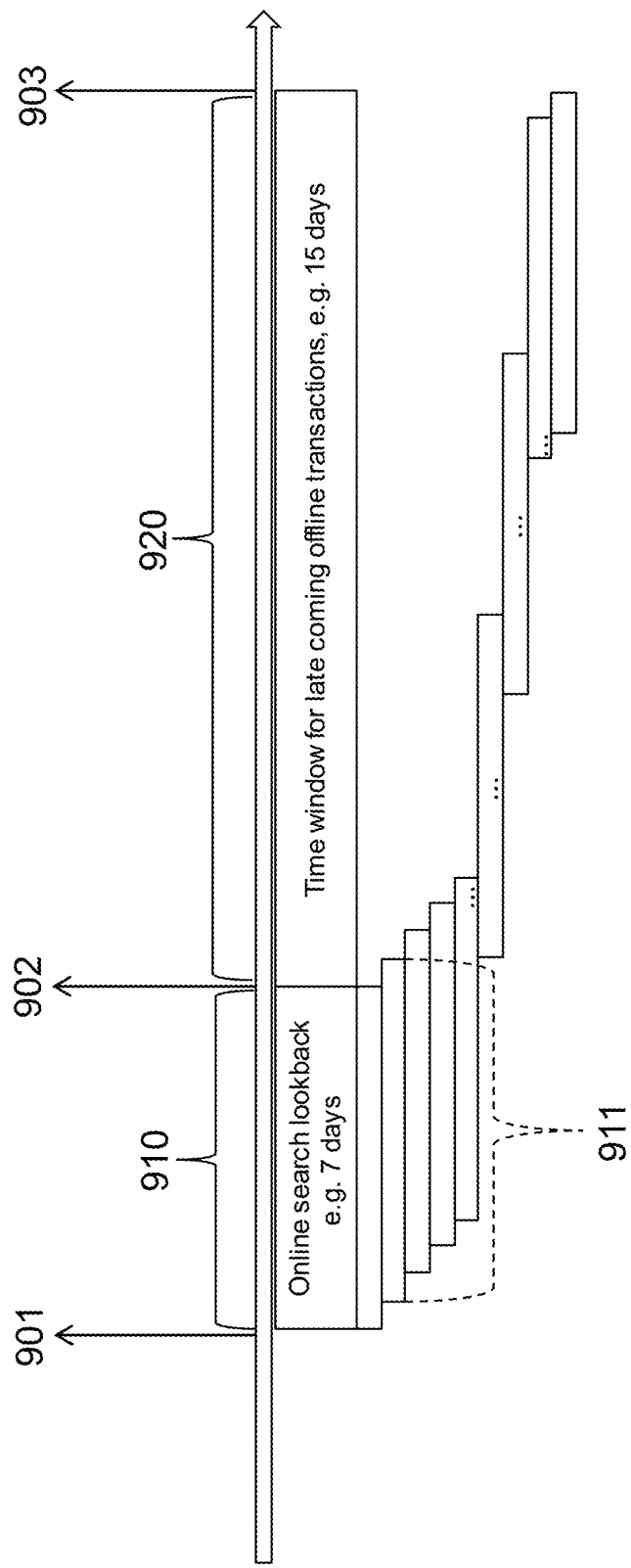
FIG. 9 illustrates a second exemplary association between online search data and offline transaction data, in accordance with some embodiments of the present teaching.

FIG. 9 illustrates a second exemplary association between online search data and offline transaction data, in accordance with some embodiments of the present teaching. In the example of FIG. 9, a first time window (e.g. 7 days) 910 is set up to check online and offline data to associate each online search with a corresponding offline sale having an offline sale date within 7 days from the online search date 901. In addition, a second time window (e.g. 15 days) 920 is set up to wait for late coming offline transaction data. This means data of an offline sale may be collected by the search result computing device 102 at a date 903, which may be 15 days at latest from the true offline sale date 902. That is, the search result computing device 102 may need to collect online and offline data for as long as 7+15=22 days, to aggregate online and offline data for online search behaviors performed 22 days ago, and update the online-offline data association for all of the 22 days. In some embodiments, each of the first time window 910 and the second time window 920 is a rolling window, such that the data association may be updated every day. In some embodiments, the first time window 910 is a rolling window and can be overlapped with the next 7-day time window 911, as shown in FIG. 9.

In some embodiments, the online search data may comprise a user identification (ID) of the user and an item ID for each of the plurality of items. In some embodiments, the in-store purchase data comprise the user ID of the user and item ID for each of the at least one item purchased offline. In some embodiments, the in-store purchase data and the online search data are associated based on the user ID and the same item IDs. In some embodiments, the user ID is determined based on at least one of: a credit card that is saved online in the user account and used by the user for offline transaction; a payment app that is used by the user for the at least one offline transaction and is saved by a mobile app associated with the online retailer; or a payment app that is associated with the online retailer and used by the user for the at least one offline transaction.

In some embodiments, the query is submitted by the user for a plurality of times before the at least one offline transaction. In some embodiments, the online search data used for generating the order feedback signal are data merely related to the query submitted the latest time of the plurality of times. That is, if a user submits multiple duplicated searches with a same query (e.g. within 7 days) before the offline transaction, only data from the latest one of the multiple duplicated searches are used to associate with the offline transaction.

Figure 10:
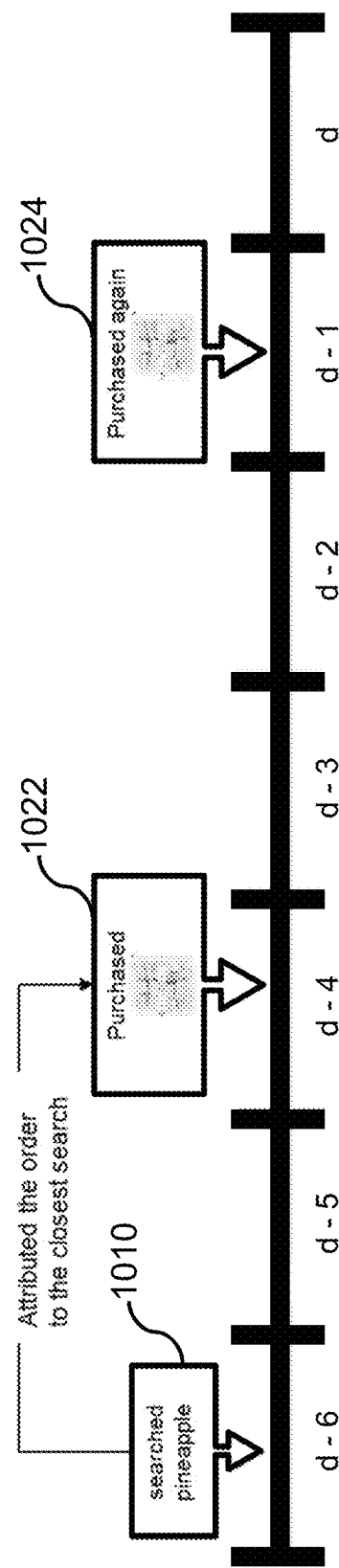
FIG. 10 illustrates a third exemplary association between online search data and offline transaction data, in accordance with some embodiments of the present teaching.

In some embodiments, an item of the plurality of items is purchased for a plurality of times in a plurality of offline transactions respectively. In some embodiments, each of the plurality of offline transactions is initiated within the predetermined time period after the online search result is generated. In some embodiments, the in-store purchase data used for generating the order feedback signal are data merely related to the item purchased in the earliest transaction of the plurality of offline transactions because it has the most direct impact on the offline transactions. As shown in FIG. 10, when a user or customer buys the same items in different transactions 1022, 1024 after an online search 1010, the online search data is associated with only the offline transaction record with an earliest purchase date among the different transactions. In the example of FIG. 10, only the offline transaction 1022 (having a date closest to the online search 1010) is associated with the online search data, for future search ranking enhancement.

Figure 11:
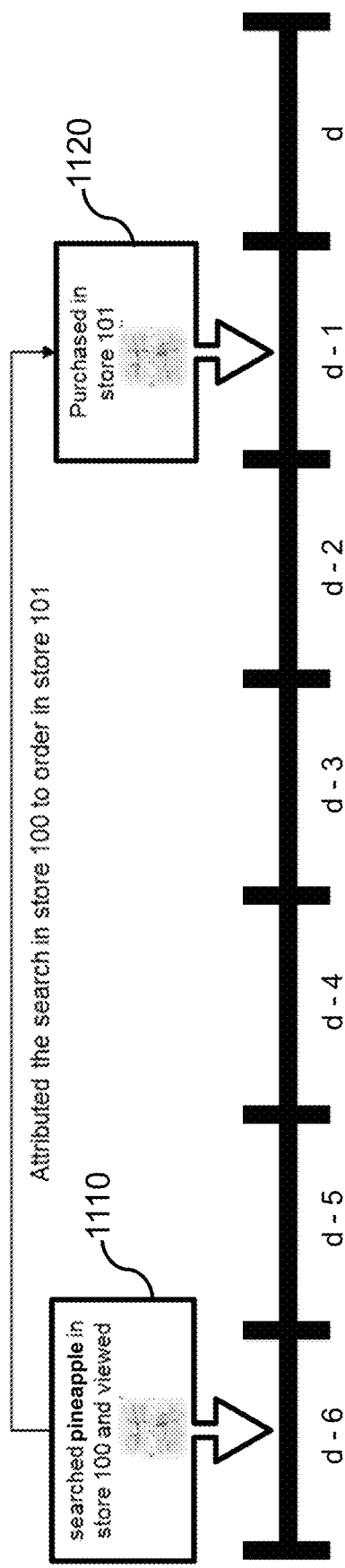
FIG. 11 illustrates a fourth exemplary association between online search data and offline transaction data, in accordance with some embodiments of the present teaching.

In some embodiments, the one or more physical retail stores include at least one of: the first physical retail store, or a second physical retail store different from the first physical retail store. As shown in FIG. 11, a user may search in one store 1110 and see the price options from another store. Then the user might end up buying an item in the search result at a different store 1120 than the store associated with the search. In this case, the offline sale data at the store 1120 can still be associated with the search data with matching user ID and item IDs, so long as the offline sale is performed within the predetermined time period (e.g. 7 days) from the search.

Figure 12:
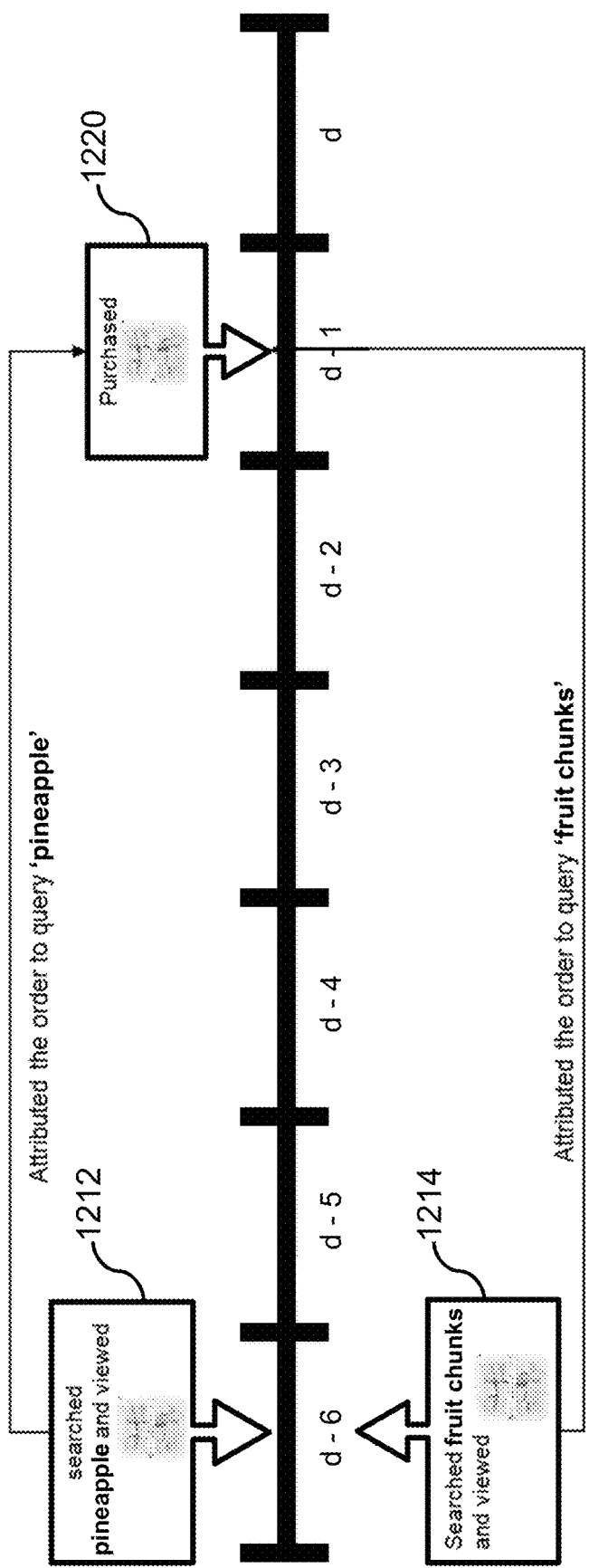
FIG. 12 illustrates a fifth exemplary association between online search data and offline transaction data, in accordance with some embodiments of the present teaching.

In some embodiments, the search result computing device 102 may be further configured to: generate, in response to an additional query from the user, an additional online search result comprising an additional item that matches the additional query, wherein the additional item is one of the plurality of items in the online search result and purchased by the user in an offline transaction included the in-store purchase data, wherein the offline transaction is initiated within the predetermined time period after the online search result is generated, and within the predetermined time period after the additional online search result is generated; and generate, for the additional item and for each of the query and the additional query, an order feedback signal by associating the in-store purchase data with the online search data. As shown in FIG. 12, a same item purchased offline can appear in multiple search results in response to different queries from a user. For example, a user buys pineapple chucks at sale 1220, which happens 5 days after two different online searches 1212, 1214 performed by the user. Two different queries "pineapple" and "fruit chunks" are submitted in the two online searches 1212, 1214 respectively. In this case, the offline transaction data of the sale 1220 may be associated with each online search data of the two online searches 1212, 1214.

Figure 7:
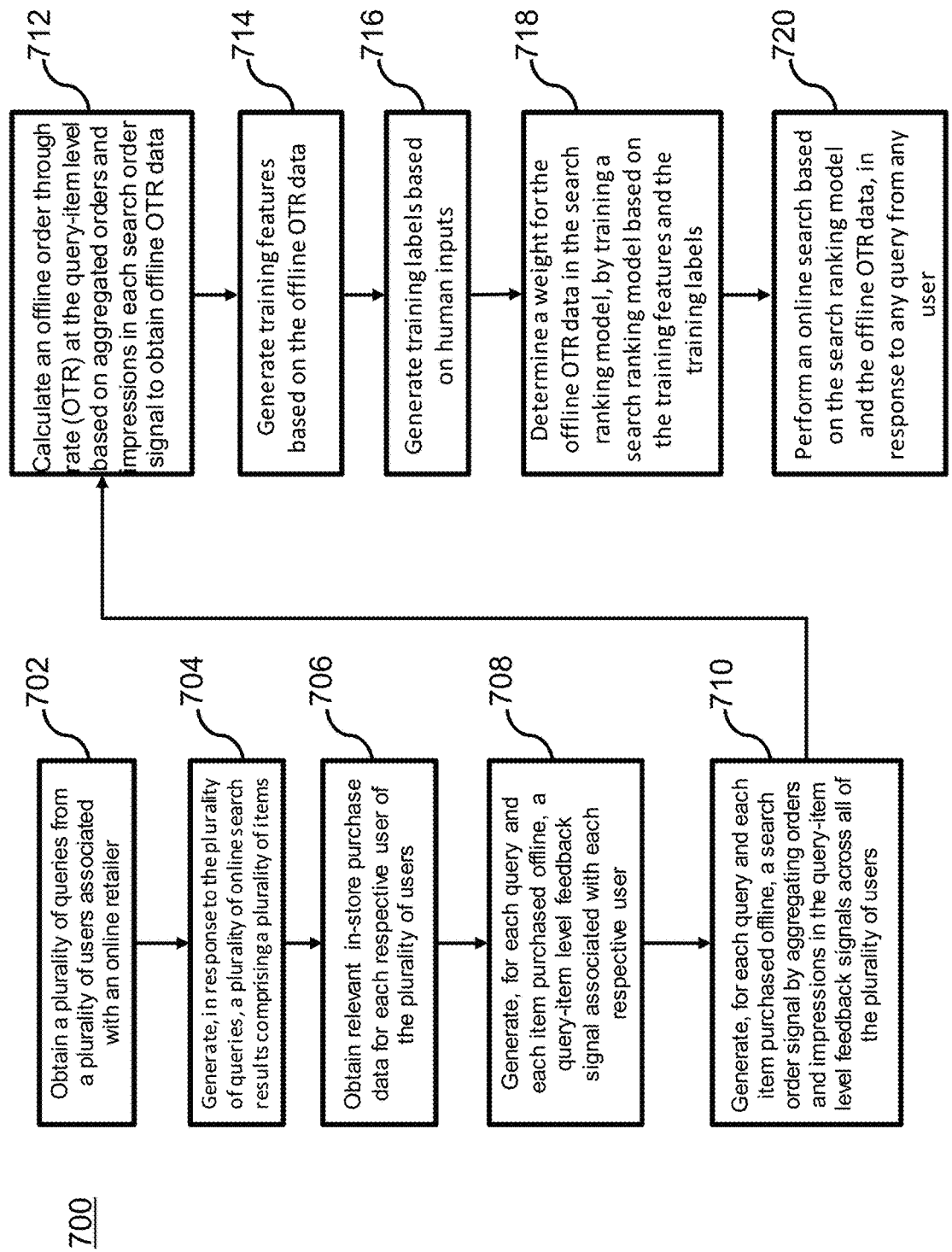
FIG. 7 is a flowchart of another exemplary method for facilitating online search, in accordance with some embodiments of the present teaching.

FIG. 7 is a flowchart of another exemplary method 700, which can be carried out by any computing device, e.g. the search result computing device 102 of FIG. 1, for facilitating online search, in accordance with some embodiments of the present teaching. At operation 702, the search result computing device 102 may obtain a plurality of queries from a plurality of users associated with an online retailer. At operation 704, the search result computing device 102 generates, in response to the plurality of queries, a plurality of online search results comprising a plurality of items. At operation 706, the search result computing device 102 may obtain relevant in-store purchase data for each respective user of the plurality of users. The relevant in-store purchase data may comprise at least one offline transaction initiated by the respective user for purchasing at least one item in the plurality of online search results at one or more physical retail stores associated with the online retailer and within a first predetermined time period after generating a corresponding one of the plurality of online search results. At operation 708, the search result computing device 102 can generate, for each query of the plurality of queries and for each item purchased offline in the relevant in-store purchase data, a query-item level feedback signal associated with each respective user of the plurality of users, by associating the relevant in-store purchase data of the respective user with the plurality of online search results. The query-item level feedback signal includes a first quantity (N_order) of offline orders for the item and a second quantity (N_impression) of impressions online related to the query-item. At operation 710, the search result computing device 102 can generate, for each query of the plurality of queries and for each item purchased offline in the relevant in-store purchase data, a search order signal by aggregating orders and impressions in the query-item level feedback signals that are across all of the plurality of users over a second predetermined time period (e.g. one year).

In some embodiments, the second predetermined time period is longer than the first predetermined time period. In some embodiments, the search result computing device 102 may further: update the search order signal at a predetermined frequency (e.g. every day, every week, or every month); and perform an online search based on a search ranking model and the updated search order signal, in response to any query from any user.

At operation 712, the search result computing device 102 may calculate an offline order through rate (OTR) at the query-item level based on aggregated orders and impressions in each search order signal to obtain offline OTR data. For example, an offline OTR may be calculated by (N_order+a)/(N_impression+b), wherein a and b are control parameters for smoothing. In some embodiments, a=3 and b=15.

At operation 714, training features are generated based on the offline OTR data. At operation 716, training labels may be generated based on human inputs. At operation 718, a weight is determined for the offline OTR data in the search ranking model, by training a search ranking model based on the training features and the training labels. In various embodiments, each of the operations 714, 716, 718 may be performed by the search result computing device 102 itself or by the ranking model training system 105 as in FIG. 3. Then at operation 720, an online search may be performed based on the trained search ranking model, where the offline OTR data is a feature in the model, in response to any query from any user. The order of the operations in FIG. 7 can be changed according to different embodiments of the present teaching.

Figure 13:
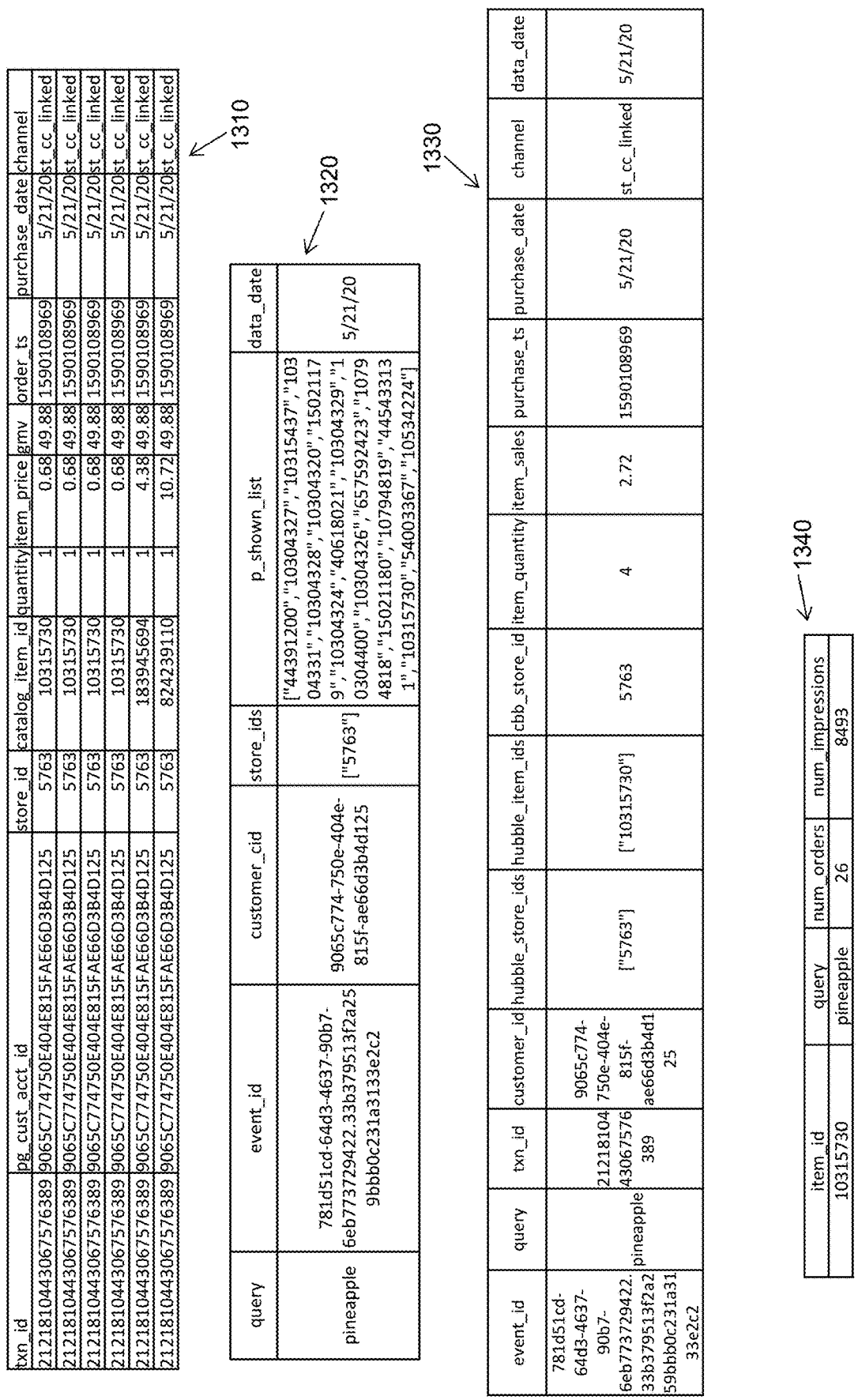
FIG. 13 illustrates an example of data aggregation of online search data and offline transaction data, in accordance with some embodiments of the present teaching.

FIG. 13 illustrates an example of data aggregation of online search data and offline transaction data, in accordance with some embodiments of the present teaching. FIG. 13 illustrates an exemplary offline transaction table 1310, an exemplary online search table 1320, an exemplary order feedback signal or table 1330, and an exemplary search order signal or table 1340. As shown in FIG. 13, the offline transaction table 1310 includes offline transaction data about: order ID (marked as "txn_id"), customer ID (marked as "pg_cust_acct_id"), store ID (marked as "store_id"), item ID (marked as "catalog_item_id"), item sale quantity (marked as "quantity"), item price (marked as "item_price"), item sale value (marked as "gmv"), order time stamp (marked as "order_ts"), purchase date (marked as "purchase_date"), and payment method and channel (marked as "channel"). As shown in FIG. 13, the online search table 1320 includes online search data about: query, online event ID (marked as "event id"), customer ID (marked as "customer_cid"), store ID (marked as "store_ids") associated with a store for the search, a list of item IDs in the search result items in response to the query (marked as "p_shown_list"), and the online search data date (marked as "data_date").

The order feedback signal or table 1330 may be generated by associating the offline transaction table 1310 with the online search table 1320 based on customer ID and item ID. In this example, the order feedback table 1330 includes data about: query from the online search table 1320, online event ID (marked as "event id") from the online search table 1320, order ID (marked as "txn_id") from the offline transaction table 1310, customer ID (marked as "customer_id") of "9065c774-750e-404e-815f-ae66d3b4d125" which is in both the offline transaction table 1310 and the online search table 1320, store ID (marked as "hubble_store_ids") for online search from the online search table 1320, store ID (marked as "cbb_store_id") for offline purchase from the offline transaction table 1310, item ID (marked as "hubble_item_ids") of "10315730" which is in both the offline transaction table 1310 and the online search table 1320, total item sale quantity (marked as "item_quantity") by aggregating "quantity" from the offline transaction table 1310, total item sale value (marked as "item_sales") by aggregating price and quantity data from the offline transaction table 1310, order time stamp (marked as "purchase_ts") from the offline transaction table 1310, purchase_date (marked as "purchase_date") from the offline transaction table 1310, payment channel (marked as "channel") from the offline transaction table 1310, and online search data_date (marked as "data_date") from the online search table 1320.

The search order signals may be generated by aggregating the order number and impression number of the order feedback signals for each query-item pair. For example, the search order signal or table 1340 is for query "pineapple" and item ID of "10315730", after aggregating all order feedback tables 1330 for all users over a time window, e.g. a year, regarding the query "pineapple" and item ID of "10315730". In this example, there are in total 26 offline transaction orders of the item "10315730" each happened within 7 days from a respective online search of the query "pineapple" by a respective user, upon 8493 impressions of the item in search results to the query "pineapple" over a year's data collection. In some embodiments, an offline OTR can be calculated based on (26+a)/(8493+b) from the query-item level search order signal, where a and b are predetermined control parameters for smoothing. The calculated offline OTR for each query-item pair may be utilized to facilitate future search ranking, and train or update a search ranking model.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system, comprising:
   a computing device configured to:
   obtain, from a first database via a transceiver, historical search data comprising a plurality of historical search results each comprising a plurality of items, an associated query, and an associated user;
   obtain, from a second database via the transceiver, in-store purchase data comprising a plurality of offline transactions, wherein each of the plurality of offline transactions is associated with the associated user of at least one of the historical search results, wherein the in-store purchase data comprise at least one offline transaction initiated by the associated user, wherein the at least one offline transaction includes a transaction including at least one item of the plurality of items associated with the at least one of the historical search results, and wherein the transaction is within a predetermined time period of the associated query;
   generate, by at least one processor and for each of the plurality of offline transactions, an order feedback signal by associating the in-store purchase data of the associated user with the plurality of items for the associated query; and
   train, by the at least one processor a search model utilizing a training dataset comprising a plurality of training features based on the historical search results and the order feedback signal for each of the plurality of offline transactions;
   receive, at a web server, a query; and
   implement, by the at least one processor, the search model to generate an online search result.

2. The system of claim 1, wherein the online search result comprises location information within a first physical retail store for at least one item included in the online search result.

3. The system of claim 1, wherein the predetermined time period is one of: a day, a week, seven days, a month, or a time period depending on the at least one offline purchase.

4. The system of claim 1, wherein the historical search results comprise a user identification (ID) of the at least one associated user and a first item ID for each of the plurality of items, wherein the in-store purchase data comprises the user ID of the at least one associated user and a second item ID for each of the at least one offline purchase, and wherein the in-store purchase data and the historical search results are associated based on the user ID and the first and second item IDs.

5. The system of claim 4, wherein the user ID is determined based on at least one of:
   a credit card that is saved online and used by the at least one associated user for the at least one offline transaction;
   a payment app that is used by the at least one associated user for the at least one offline transaction; or
   a payment app that is used by the at least one associated user for the at least one offline transaction.

6. The system of claim 1, wherein:
   the historical search results comprise a first associated query and a second associated query wherein the second associated query has a more recent associated time; and the training dataset comprises data related to the second associated query.

7. The system of claim 1, wherein:
an item of the plurality of items is purchased for a plurality of times in a plurality of offline transactions respectively;
each of the plurality of offline transactions is initiated within the predetermined time period after the online search result is generated; and
the training dataset comprises data related to an item purchased in an earliest transaction of the at least one offline transaction.

8. The system of claim 1, wherein the computing device is further configured to:
generate, in response to receiving an additional query, an additional online search result comprising an additional item that matches the additional query,
wherein the additional item is one of the plurality of items in the online search result and purchased by the associated user in an offline transaction included the in-store purchase data,
wherein the offline transaction is initiated within the predetermined time period after the online search result is generated, and within the predetermined time period after the additional online search result is generated; and
generate, for the additional item and for each of the query and the additional query, an order feedback signal by associating the in-store purchase data with the historical search results.

9. The system of claim 1, wherein the computing device is further configured to:
generate, for each associated query and for each item purchased offline in the in-store purchase data, a query-item level feedback signal including a first quantity of offline orders for the item and a second quantity of impressions related to the query; and
generate, for each associated query and for each item purchased offline in the in-store purchase data, a search order signal by aggregating orders and impressions in the query-item level feedback signals over a second predetermined time period, wherein the second predetermined time period is longer than the predetermined time period.

10. The system of claim 9, wherein the computing device is further configured to:
update the search order signal at a first predetermined frequency; and
train an updated search model based, at least in part, on the updated search order signal.

11. The system of claim 9, wherein the computing device is further configured to calculate an offline order through rate (OTR) at the query-item level based on aggregated orders and impressions in each search order signal to obtain offline OTR data, wherein the training dataset comprises the offline OTR data.

12. The system of claim 11, wherein the computing device is further configured to:
generate training features based on the offline OTR data;
generate training labels based on human inputs; and
determine a weight for the offline OTR data in the search model, by using XGBoost to train the search model based on the training features and the training labels.

13. A computer-implemented method, comprising:
obtaining, from a first database via a transceiver, sets of historical search data comprising a plurality of historical search results, wherein each of the sets of historical search results comprises a plurality of items, an associated query, and an associated user;
obtaining, from a second database via the transceiver, in-store purchase data comprising a plurality of offline transactions, wherein each of the plurality of offline transactions is associated with the associated user of at least one of the historical search results, wherein the in-store purchase data comprise at least one offline transaction initiated by the associated user, wherein the at least one offline transaction includes a transaction including at least one item of the plurality of items associated with the at least one of the historical search results, and wherein the transaction is within a predetermined time period of the associated query;
generating, by at least one processor and for each of the plurality of offline transactions, an order feedback signal by associating the in-store purchase data of the associated user with the plurality of items for the associated query; and
training, by the at least one processor, a search model utilizing a training dataset comprising a plurality of training features based on the historical search results and the order feedback signal for each of the plurality of offline transactions;
receiving, by a web server, a query; and
implementing, by the at least one processor, the search model to generate an online search result based on the query.

14. The method of claim 13, wherein the historical search results comprise a user identification (ID) of the at least one associated user and a first item ID for each of the plurality of items, wherein the in-store purchase data comprises the user ID of the at least one associated user and a second item ID for each of the at least one offline purchase, wherein the in-store purchase data and the historical search results are associated based on the user ID and the first and second item IDs, and wherein the user ID is determined based on at least one of:
a credit card that is saved online and used by the at least one associated user for the at least one offline transaction;
a payment app that is used by the at least one associated user for the at least one offline transaction; or
a payment app that is used by the at least one associated user for the at least one offline transaction.

15. The method of claim 13, wherein the historical search results comprise a first associated query and a second associated query wherein the second associated query has a more recent associated time; and wherein the training dataset comprises data related to the second associated query.

16. The method of claim 13, wherein an item of the plurality of items is purchased for a plurality of times in a plurality of offline transactions respectively, wherein each of the plurality of offline transactions is initiated within the predetermined time period after the online search result is generated, and wherein the training dataset comprises related to an item purchased in an earliest transaction of the at least one offline transaction.

17. A non-transitory computer readable medium having instructions stored thereon, wherein the instructions, when executed by at least one processor, cause a device to perform operations comprising:
obtaining, from a first database via a transceiver, sets of historical search data comprising a plurality of historical search results, wherein each of the sets of historical search results comprises a plurality of items, an associated query, and an associated user;

obtaining, from a second database via the transceiver, in-store purchase data comprising a plurality of offline transactions, wherein each of the plurality of offline transactions is associated with the associated user of at least one of the historical search results, wherein each of the plurality of offline transactions comprises a transaction including at least one item of the plurality of items associated with the at least one of the historical search results, and wherein the transaction is within a predetermined time period of the associated query;

generating, by at least one processor and for each of the plurality of offline transactions, an order feedback signal by associating the in-store purchase data of the associated user with the plurality of items for the associated query; and training a search model utilizing a training dataset comprising a plurality of training features based on the historical search results and the order feedback signal for each of the plurality of offline transactions;

receiving, at a web server, a query; and implementing, by the at least one processor, the search model to generate an online search result based on the query.

* * * * *